UNITED STATES PATENT OFFICE.

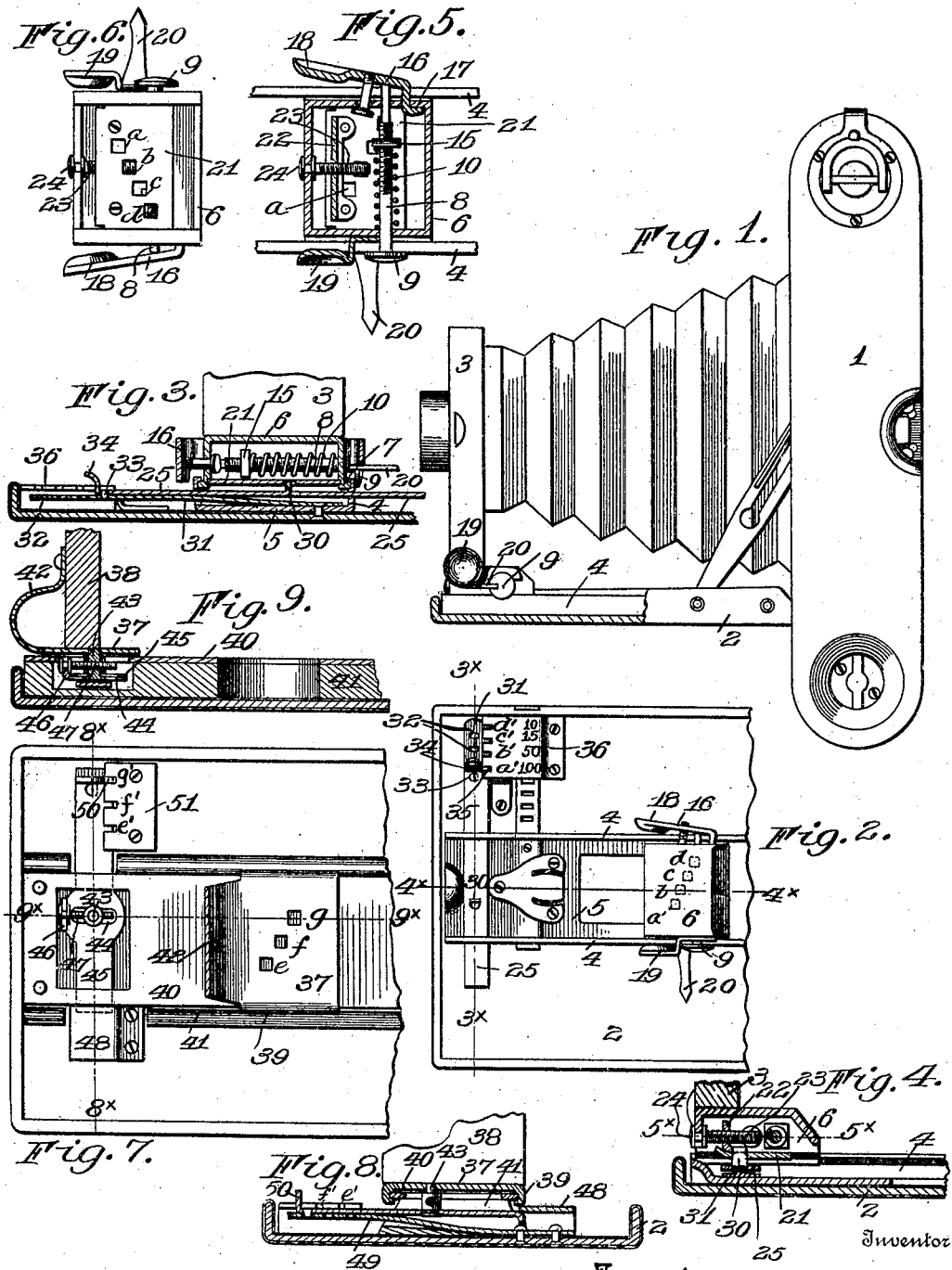

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

LENS-FOCUSING DEVICE.

No. 834,884.  Specification of Letters Patent.  Patented Nov. 6, 1906.

Application filed August 3, 1904. Serial No. 219,286.

*To all whom it may concern:*

Be it known that I, FRANK A. BROWNELL, of Rochester, in the county of Monroe and State of New York, have invented certain new and useful Improvements in Lens-Focusing Devices; and I do hereby declare the following to be a full, clear, and exact description of the same, reference being had to the accompanying drawings, forming a part of this specification, and to the reference characters marked thereon.

My present invention relates to photographic cameras, and particularly to that class in which the lens and focusing screen or picture-plane are relatively adjustable, this adjustment being usually obtained by moving one or the other of said parts forward or rearward on the guides or ways supporting it on the camera-bed.

My invention has for its object to apply to a camera a focusing mechanism embodying generally a stop adapted to be mounted on the camera-bed and a plurality of shoulders arranged on the movable part and coöperating with said stop, whereby the latter may be set and the movable part operated into engagement therewith to adjust the camera to obtain clear and well-defined pictures of objects located at different distances from the camera. My invention has for its further object to provide means to permit a relative adjustment of the stop on the shoulders coöperating therewith in the respective parts on which they are mounted in the direction of travel of the movable part, whereby the latter when in the set position may be further adjusted to compensate for variations in the focal lengths of different lenses.

In the drawings, Figure 1 is a side elevation of a camera provided with a focusing device constructed in accordance with my invention. Fig. 2 is a top plan view of the camera-bed. Fig. 3 is a cross-sectional view thereof on the line $3^\times$ $3^\times$ of Fig. 2, shown with the lens-carriage in the outward or adjusted position. Fig. 4 is a longitudinal sectional view on the line $4^\times$ $4^\times$ of Fig. 2 with the lens-carriage in adjusted position. Fig. 5 is a horizontal sectional view on the line $5^\times$ $5^\times$ of Fig. 4, and Fig. 6 is a bottom plan view of the carriage or support for the lens-mounting. Fig. 7 is a plan view of a camera-bed, showing a focusing device embodying a modification of the invention. Fig. 8 is a sectional view thereof on the line $8^\times$ $8^\times$ of Fig. 7, and Fig. 9 is a longitudinal sectional view on the line $9^\times$ $9^\times$ of Fig. 7.

Similar reference characters in the several figures indicate similar parts.

In illustrating my invention I have shown it applied to a folding pocket-camera embodying the casing or body 1, to which is hinged the front portion, which is adapted to be folded outwardly to form the bed 2, carrying ways on which is mounted a carriage supporting the lens board or mount 3. In the present illustration the ways on the bed 2 are formed by channels in the proximate sides of vertically-extending edges 4 of a plate 5, and the carriage operating on the way-plate consists of a hollow rectangular base 6, having at opposite sides outwardly-extending edges, forming guides 7, engaging the channels therein. Extending through the sides of the base 6 is a clamping member in the form of a bolt 8, having a head 9, adapted to engage the outer edge of one of the sides 4 of the channel-bar and to be normally moved into engagement therewith by means of a coil-spring 10, the tension of which may be adjusted by means of a nut 15, arranged on the threaded portion of the bolt, as shown particularly in Fig. 5. The extremity of the bolt projects a short distance beyond the side of the carriage, and engaging therewith is a lever-arm 16, the hook end 17 of which extends through an aperture in the carriage and forms a fulcrum, while the outer end of the lever is cup-shaped, as indicated at 18, to form a convenient grasp for the operator's finger. Rigidly attached to the opposite side of the carriage is a plate 19, forming a finger-piece corresponding to the lever 16, which is also adapted to be grasped by the operator's fingers to facilitate the adjustment of the carriage inwardly and outwardly on the ways when the lever 16 is compressed to release it. This is a simple arrangement of the parts for clamping the lens-mount in any desired position of adjustment on the camera-bed, and, if desired, the carriage may be further provided with a laterally-projecting index-finger 20, adapted to register with a suitable scale (not shown) arranged upon the bed to indicate the adjustment of the lens relatively to the focusing plane of the camera.

The edge of the index-finger 20 preferably rests in a notch provided in the head 9, as shown in Fig. 1, to prevent its rotation during the adjustment of the nut 15.

As it is desirable to provide means for quickly adjusting the movable part of the camera, I provide in addition to the clamping devices just described interlocking stop mechanism arranged between the bed and the movable part of the camera, whereby said part may be moved outwardly and automatically locked in adjusted position. In the present embodiment of my invention I have shown this mechanism as arranged between the camera-bed and the carriage carrying the lens-mount, which may be set for one or another of the various focusing positions of the lens, which will automatically arrest the latter in the desired position to focus it upon objects at a predetermined distance from the camera. Between the coöperating parts of this mechanism I also provide a relative adjustment to compensate for the difference in the focal length of different lenses, adapting the parts for use upon different cameras and permitting each focusing device to be adjusted to the peculiarities of the particular lens with which it may be employed.

In the preferred form of my device I employ a plate 21, supported at its edges in grooves formed in the inner faces of the sides of the carriage 6 and provided with a plurality of apertures $a$, $b$, $c$, and $d$, extending transversely of the plate and stepped one in rear of another, as shown particularly in Fig. 6. The forward edge of the plate is bent upward slightly, as shown in Fig. 4, and in rear thereof is a small bracket 22, having a threaded aperture receiving a bolt 23, having a head 24, formed with inner and outer flanges engaging on opposite sides of the front wall of the carriage 6, whereby the bolt will be held relatively stationary thereon and when rotated in one direction or the other will cause the plate to be moved forwardly or rearwardly on the carriage. At the forward end of the bed is an adjustable member in the form of a bar 25, guided in apertures formed in the sides 4 of the channel-bar 5 and movable transversely of the path of the lens-carriage. On this bar 25 is an upwardly-extending stop 30, projecting above the path of the plate 21, and which will be depressed by the forward edge of said plate, permitting the stop to pass beneath it and to engage one or another of the shoulders formed by the apertures $a$, $b$, $c$, and $d$.

The bar 25 is yieldingly projected upwardly by a leaf-spring 31, and at its outer end it is provided with a finger-piece 34, at the side of which is a small projection 35, adapted to register with recesses $a'$ $b'$ $c'$ $d'$, provided in the overhanging edge of a scale-plate 36, said notches being arranged therein to correspond with the shoulders formed by the apertures in the plate 21, so that when the bar is moved laterally into engagement with one of the recesses the stop 30 will register with the corresponding aperture in the plate 21 when the lens-carriage is moved outwardly relatively to the focusing-screen. The engagement and disengagement of the bar 25 with the index-plate 36 is accomplished by the vertical movement of said bar, which also carries the stop or projection 30 into and out of engagement with the shoulders on the lens-carriage. For this reason I provide the spring 31 with recesses 32, corresponding to the recesses in the index or scale plate, with which engages a small lug or projection 33 on the bar 25, so that when the latter is moved downwardly against the tension of the spring to disengage the stop 30 it will be held in its adjusted position relatively to the scale or index plate, and when released the projection 35 thereon will engage the recess with which it previously registered. The lug 33 is made comparatively short, so that it may be slipped from one aperture or depression in the spring to another when the bar is depressed, as will be understood.

The recesses or apertures formed on the scale-plate may be designated by numerals, such as 10, 15, 50, and 100, to indicate the various focal distances of the camera-lens and the shoulders formed by the apertures $a$, $b$, $c$, and $d$ on the plate 21, being positioned thereon relatively to the notches of the index-plate, so that when they engage the stop 30 the camera-lens will be located relatively to the focusing-screen or picture-plane of the camera to make a clear and well-defined image of objects located distances from the camera corresponding to the indication with which the projection 35 on the bar 25 registers.

In Figs. 7, 8, and 9 I have illustrated a modified construction in which the carriage (indicated by 37 and supporting the lens board or mount 38) is provided with overhanging grooved edges 39, adapted to receive the edges of a way-plate 40, supported upon a filling-piece 41 on the camera-bed. The carriage 37 is provided with a plurality of apertures $e$, $f$, and $g$, and at its forward end is the outwardly-rounded and upwardly-extending tongue 42, attached at its upper end to the lens-mount and forming a convenient handle to be grasped by the operator's fingers when manipulating the latter. The stop coöperating with the shoulders formed by the apertures in the carriage consists of a pin 43, having a grooved head, the sides of which guide the pin in its movement in an elongated aperture or slot 44, provided in the adjusting-bar 45. The latter is capable of being moved laterally of the camera-bed, and the slot 44 formed therein extends in the direction of the movement of the lens-carriage. At one end of the slot is provided a slotted lip 46, adapted to receive the duplex-headed adjusting-screw 47, projecting through a threaded aperture in the pin or stop 43, thus enabling the stop to be moved forwardly or rearwardly on the camera-bed to enable the proper adjustment of the camera-lens. In these figures the adjusting-bar 45 is held in place in a suitable recess beneath the way-plate 40, and its outer end is guided beneath the overhanging end of the bracket 48 when the bar is adjusted to its innermost position. A spring 49, similar to the spring 31, projects the bar upwardly, holding a lug or projection 50 thereon in engagement with one of the several notches $e'$, $f'$, and $g'$ of the index-plate 51 and also projecting the stop 43 in the path of the carriage 37.

The devices embodying my invention, which I have shown and described, are simple and consist of few parts, which are capable of being easily applied to various forms of cameras, although they are particularly adapted for use upon folding or pocket cameras, as they facilitate their operation, for when an operator desires to photograph a particular object he has simply to adjust the laterally-movable stop and draw the lens-carriage outwardly into engagement therewith, when it will be locked against accidental displacement.

A further advantage of the device will be appreciated from the fact that the difficulty of focusing the lens by adjusting the movable part to cause the usual index-finger to register with a particular indication on a scale is obviated and that the lens may be set for a particular distance an indefinite number of times and the same result obtained at each operation. Again, these parts being accurately adjusted by experts during the process of manufacture, careless as well as careful operators will attain equally good results.

While I have illustrated the focusing mechanism as employed in conjunction with the lens-carriage, it will be understood that the latter might be the stationary part, when the focusing-screen or picture-plane would then be the relatively adjustable portion, and that an equivalent arrangement of the focusing mechanism might be employed for adjustably securing it in the focal plane of the lens.

I claim as my invention—

1. The combination with a camera, embodying a bed and a relatively adjustable lens-support and a focusing-screen supported on the bed, of a plurality of stepped shoulders on the adjustable part, a stop on the bed and means for adjusting it into alinement with one or another of said shoulders.

2. The combination with a camera, embodying a bed and a lens-support and a focusing-screen arranged on the bed, one of said parts being capable of adjustment relatively to the other of a plurality of shoulders on the adjustable part stepped relatively to each other and a stop adjustable into alinement with the several steps to limit the movement of said movable part.

3. The combination with a camera, embodying a bed and a lens-support and a focusing-screen arranged on the bed, one of said parts being capable of adjustment relatively to the other, of a plurality of shoulders on the adjustable part stepped relatively to each other and a transversely-adjustable stop on the bed adapted to coöperate with said shoulders.

4. The combination with a camera, embodying a bed and a lens-support and a focusing-screen arranged on the bed, one of said parts being capable of adjustment relatively to the other, of a plurality of shoulders on the adjustable part located on the side proximate the bed, a stop on the latter movable laterally thereof to coöperate with one or another of said shoulders and means for retracting the stop out of engagement with the coöperating shoulder.

5. The combination with a camera, embodying a bed and a lens-support and a focusing-screen arranged on the bed, one of said parts being capable of adjustment relatively to the other, of a plurality of shoulders located on the bottom of the adjustable part, a yielding stop on the bed adjustable laterally into alinement with the different shoulders and means for depressing it out of engagement therewith.

6. The combination with a camera, having a bed and a lens-support movably mounted thereon, of a plurality of shoulders on the support arranged out of alinement with each other and located one in rear of another, a stop mounted on the bed and means for adjusting it to coöperate with the various shoulders.

7. The combination with a camera, ways thereon and a lens-support guided on the ways, of a plurality of stepped shoulders on the support, a stop located in the path of the latter and means for adjusting it into alinement with one or another of said shoulders.

8. The combination with a camera, ways thereon and a lens-support guided on the ways, of a plurality of stepped shoulders on the support, a stop located in the path of the latter and means movable laterally of the ways for positioning the stop in alinement with one or another of said shoulders.

9. The combination with a camera, ways thereon and a lens-support guided on the ways, of a plurality of shoulders extending transversely and rearwardly on the support, an arm guided to move laterally on the ways and a stop carried thereby and adapted to coöperate with the various shoulders.

10. The combination with a camera, ways thereon and a lens-support guided on the ways, of a plurality of shoulders extending transversely and rearwardly on the support, an arm movable laterally on the bed, an index-plate provided with notches corresponding to the shoulders on the support with which said arm engages and a stop on the latter coöperating with the shoulders.

11. The combination with a camera-bed, a lens-support movable longitudinally thereon and stepped shoulders on the support, of an arm movable transversely on the bed, a stop thereon and means for causing a relative adjustment between the shoulders and stop in the direction of movement of the lens-support.

12. The combination with a camera-bed, ways thereon and a lens-support guided on the ways and provided with stepped shoulders in its lower side, of an arm supported in the ways and movable transversely thereof, a stop on the arm and a spring for moving it into engagement with said shoulders.

13. The combination with a camera-bed, ways thereon and a lens-support guided on the ways and provided with stepped shoulders in its lower side, of an arm supported in the ways and movable vertically and transversely thereof, and a stop on the arm, an index-plate on the bed coöperating with the arm to locate said stop in alinement with the various shoulders and a spring for holding the stop in yielding engagement with said shoulders and the arm in engagement with the index-plate.

14. The combination with a camera-bed, a lens-support movable longitudinally thereon and a plate having shoulders mounted on the lens-support, of a stop adapted to be moved into alinement with one or another of said shoulders and to coöperate therewith and means for causing a relative movement between the plate and stop in a longitudinal direction on the bed to vary the arrested position of the lens-support thereon.

15. The combination with a camera-bed, a lens-support movable longitudinally thereon and a shoulder on the support, of a stop movable into and out of engagement with the shoulder to limit the outward movement of the support, and means for adjusting one of said engaging parts in a lateral direction relatively to the other to vary the arrested position of the lens-support on the bed.

16. The combination with a camera-bed, a lens-support movable longitudinally thereon and a plate having shoulders and means for adjusting the plate forwardly and rearwardly on the lens-support relatively to the direction of its movement on the bed, of a stop adapted to coöperate with the shoulders on the plate.

17. The combination with a camera-bed, having ways thereon, a carriage engaging the ways and a lens-support on the carriage, of a plate, means for adjusting it relatively forwardly or rearwardly on the lens-carriage, a shoulder on the plate and a relatively stationary stop located on the bed and coöperating with the shoulder.

18. The combination with a camera-bed having ways thereon and a carriage having depending side portions engaging the ways and provided with grooves, of a plate supported in the grooves and provided with a shoulder, a screw for adjusting the plate relatively on the carriage and a stop on the bed adapted to engage the shoulder on the plate.

19. In a focusing device, the combination with a camera-bed having ways thereon, a carriage guided on the ways and a lens-support on the carriage, of a plurality of shoulders on the latter, a stop coöperating therewith and a bar for adjusting it having a projection thereon, an index-plate provided with recesses adapted to receive the projection and a spring yieldingly holding said parts in engagement.

20. In a focusing device, the combination with a camera-bed having ways thereon, a carriage guided on the ways and a lens-mount supported on the carriage, of a plurality of shoulders on the latter, a stop coöperating therewith and a bar for adjusting it having a lug thereon, a spring having recesses therein coöperating with the lug and operating to yieldingly hold the arm to permit the stop thereon to be disengaged from the carriage.

21. In a focusing device, the combination with a camera-bed, having ways thereon, a carriage guided on the ways and a lens-support on the carriage, of a plurality of shoulders on the latter, a stop coöperating therewith and a bar for adjusting it having a lug and a projection thereon, an index-plate having notches coöperating with the projection, a spring yieldingly holding said parts in engagement and provided with recesses coöperating with the lug to position the bar when it is moved to disengage the projection from the index-plate.

22. The combination with a camera-casing having a focusing-screen and a lens-support, said parts being capable of a relative movement toward and from each other, of a member having a plurality of stepped shoulders mounted on one of the parts and a relatively stationary stop on the other part adapted to coöperate with said shoulders.

23. In a focusing device for cameras, the combination with an adjustable lens-carriage, of an abutment movable laterally of the direction of movement of the carriage and coöperating with the latter to arrest it with the lens in focal position.

FRANK A. BROWNELL.

Witnesses:
G. WILLARD RICH,
RUSSELL B. GRIFFITH.